(12) United States Patent
Komatsu et al.

(10) Patent No.: US 7,738,998 B2
(45) Date of Patent: Jun. 15, 2010

(54) ROBOT DEVICE

(75) Inventors: Satoru Komatsu, Toyonaka (JP); Kazunori Matsumoto, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1077 days.

(21) Appl. No.: 10/547,026

(22) PCT Filed: Nov. 4, 2004

(86) PCT No.: PCT/JP2004/016328

§ 371 (c)(1),
(2), (4) Date: Aug. 25, 2005

(87) PCT Pub. No.: WO2005/062144

PCT Pub. Date: Jul. 7, 2005

(65) Prior Publication Data

US 2006/0106480 A1    May 18, 2006

(30) Foreign Application Priority Data

Dec. 18, 2003   (JP)   ............................. 2003-420652

(51) Int. Cl.
*G05B 15/02* (2006.01)
*B65G 65/02* (2006.01)
*G06F 19/00* (2006.01)

(52) U.S. Cl. .................... 700/264; 700/169; 198/502.3; 198/478.1; 307/140

(58) Field of Classification Search ............... 700/169, 700/12, 264, 15, 17, 19, 108, 245, 110, 295, 700/297, 249, 112, 254; 301/31; 307/113, 307/134, 140; 425/136; 198/339.1, 341.01, 198/349, 571, 502.1, 478.1, 502.3; 318/568.24, 318/596, 101, 103, 563, 568.11; 414/730; 361/628, 631; 702/188

See application file for complete search history.

(56) References Cited

U.S. PATENT DOCUMENTS 5,241,482 A * 8/1993 Iida et al. .................... 700/110
5,412,528 A   5/1995 Mader et al.

(Continued)

FOREIGN PATENT DOCUMENTS

JP          05-042493 A      2/1993

(Continued)

OTHER PUBLICATIONS

Japanese Office Action.

*Primary Examiner*—Thomas G Black
*Assistant Examiner*—Christine M Behncke
(74) *Attorney, Agent, or Firm*—Pearne & Gordon LLP

(57) ABSTRACT

Robot apparatus has a robot 1, a controller 2 for controlling the aforementioned robot 1 to perform working, and a plurality of external axis devices 4, 5 and 6 to be controlled by the aforementioned controller 2. The aforementioned external axis devices 4, 5 and 6 are provided with power switches 4b, 5b and 6b to be operated by an operator 9 so as to turn on/off power supplies thereto, and power supply circuits 4a, 5a and 6a to be operated from the aforementioned controller 2 so as to turn on/off the power supplies. Priority is given to operation using the aforementioned power switches 4b, 5b and 6b over operation from the aforementioned controller 2 as to turning off the power supplies to the external axis devices 4, 5 and 6.

12 Claims, 2 Drawing Sheets

U.S. PATENT DOCUMENTS

| | | | | |
|---|---|---|---|---|
| 5,555,179 A | * | 9/1996 | Koyama et al. | 700/95 |
| 5,841,257 A | * | 11/1998 | Hashimoto et al. | 318/568.11 |
| 6,041,415 A | | 3/2000 | Forster et al. | |
| 6,185,469 B1 | * | 2/2001 | Lewis et al. | 700/99 |
| 6,570,355 B2 | * | 5/2003 | Morita et al. | 318/563 |
| 6,912,427 B1 | * | 6/2005 | Pattee et al. | 700/13 |
| 7,209,805 B2 | * | 4/2007 | Motoyama | 700/286 |
| 2002/0052717 A1 | | 5/2002 | Roth et al. | |

FOREIGN PATENT DOCUMENTS

| | | |
|---|---|---|
| JP | 11-90880 | 4/1999 |
| JP | 11-113274 A | 4/1999 |
| JP | 2001-282301 A | 10/2001 |
| JP | 2002-233186 | 8/2002 |
| WO | WO 02/094527 | 11/2002 |

* cited by examiner

ROBOT DEVICE

TECHNICAL FIELD

The present invention relates to robot apparatus which can follow conditions to control on/off switching of power supplies to external devices working interlocking with the robot.

BACKGROUND ART

An industrial robot such as an arm-type robot is designed to work interlocking with external devices controlling the posture and the like of a work piece to be worked. When there is a possibility that a worker will approach these external devices, the worker makes a decision to cut the power supplies to the external devices so as to secure the worker's safety.

In addition, in some systems, a robot and a plurality of external devices such as external axis devices are divided into desired groups, and means for on/off controlling power supplies is provided in a controller for each divided control group, so that the safety of a worker can be secured simply. (For example, see Japanese Patent Publication No. JP-A-11-90880/(1999))

However, in the aforementioned method in which the power supplies are turned on/off in accordance with the user's decision, there is no means for securing the safety when the worker operates in error. On the other hand, in the method in which the means for on/off controlling the power supplies is provided in the controller for each divided control group, there has been a problem that the method is inconvenient because it cannot follow the change or the like of the work sequence of the worker.

Patent Document 1: Japanese Patent Laid-Open No. 90880/1999

DISCLOSURE OF THE INVENTION

In order to solve the foregoing problems, the present invention provides robot apparatus including: a robot; a controller for controlling working of the aforementioned robot; and a plurality of external devices to be controlled by the aforementioned controller; wherein each of the aforementioned external devices is provided with a power switch to be operated by an operator for turning on/off a power supply, and a power supply circuit to be operated from the aforementioned controller for turning on/off the power supply, while priority is given to operation using the aforementioned power switch over operation from the aforementioned controller as to turning off the power supply of the external device.

In addition, a command to turn on a power supply may be output from the controller to the power supply circuit of each of ones of the external devices which are involved in working of the robot.

In addition, a command to turn off a power supply may be output from the controller to the power supply circuit of each of ones of the external devices which are not involved in working of the robot.

In addition, the power supply circuit of each of the external devices may be connected to a power switch, so that a status of the aforementioned power switch is transmitted from the aforementioned power supply circuit to the controller.

In addition, the controller may perform an error correcting process when a power switch of an external device involved in working of the robot turns off a power supply thereto.

In addition, the robot and the external device may be suspended as the error correcting process, while display means to be controlled by the controller is provided, and a display showing an error is displayed by the display means.

In addition, when a power switch of an external device not involved in working of the robot turns on a power supply thereto, the controller may output, to the power supply circuit of the aforementioned external device, a command to cut the power supply.

In addition, the controller may change working of the robot in accordance with a status of a power switch of each of the external devices.

Consequently, it is possible to secure the safety of the robot dealing with both the working of the worker and the working of the robot.

According to the present invention, when the worker uses the power switches to cut the power supplies to external devices not involved in working of the robot, there is no fear that the controller of the robot accidentally turns on the power supplies. Thus, the worker can perform working more safely.

In addition, when the worker accidentally cuts the power supply to an external device not intended, the controller of the robot regards it as contradictory, and performs error halt. Thus, operation mistake of the worker can be prevented.

BEST MODE FOR CARRYING OUT THE INVENTION

An embodiment of the present invention will be described below with reference to the drawings.

Figure 1:
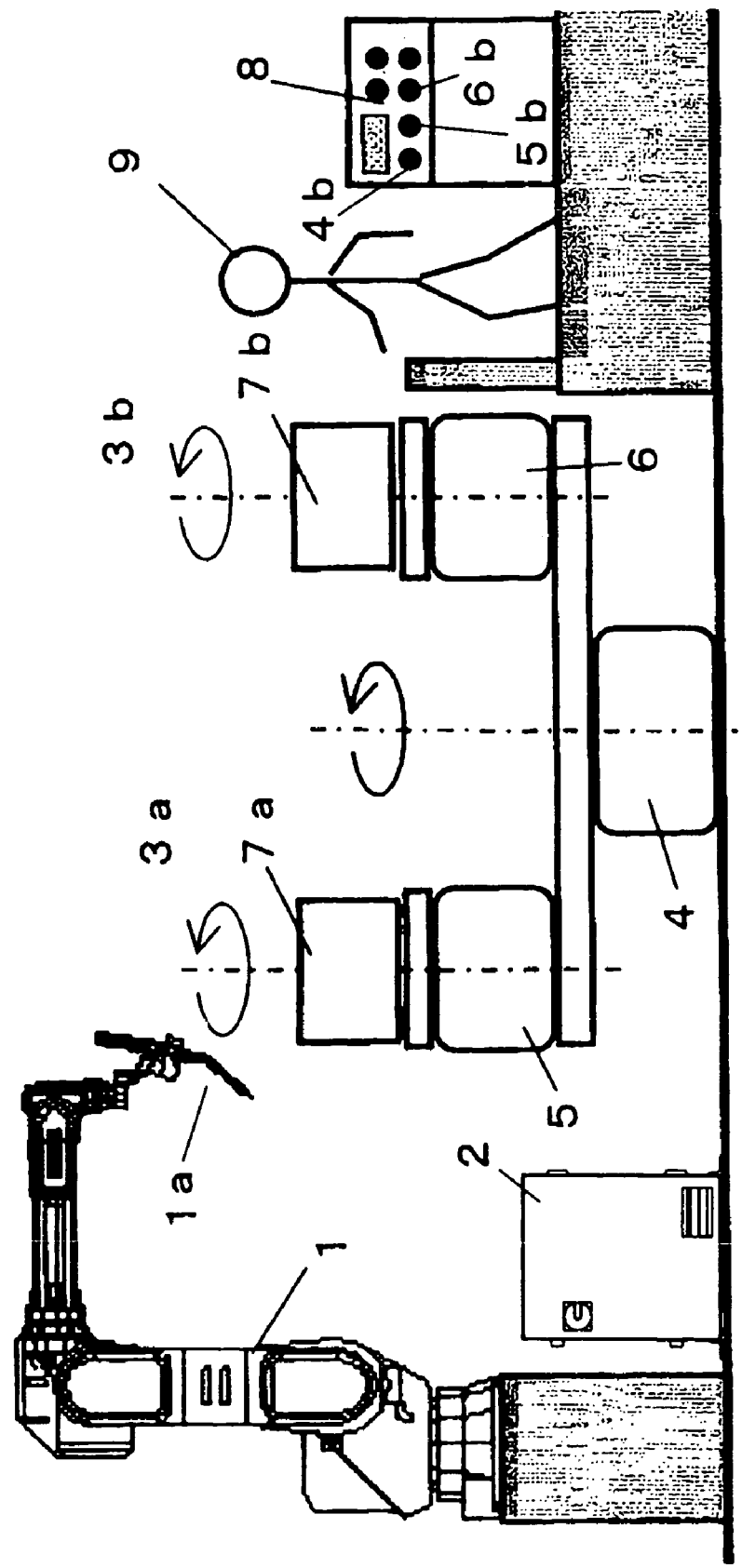
FIG. 1 A schematic view showing an embodiment of the present invention.

FIG. 1 is a schematic view of robot apparatus according to the embodiment of the present invention, in which a working tool 1a is attached to a front end of a robot 1, and working of the robot 1 is controlled by a controller 2.

A work piece (work 7a) is worked by the working tool 1a on a production working side 3a, and a work piece (work 7b) to be worked is carried out/in on a carrying in/out side 3b.

The work pieces (works 7a and 7b) are moved to the production working side 3a and the carrying out/in side 3b by an external axis device 4. An external axis device 5 for positioning the work 7a and an external axis device 6 for positioning the work 7b are disposed on this external axis device 4.

The positions of these external axis devices 5 and 6 are replaced with each other between the production working side 3a and the carrying out/in side 3b by the turnaround operation of the external axis device 4.

These external axis devices 4, 5 and 6 as external devices are connected to the controller 2.

In addition, power switches 4b, 5b and 6b for turning on/off the power supplies to the external axis devices 4, 5 and 6 are provided in a control panel 8.

Figure 2:
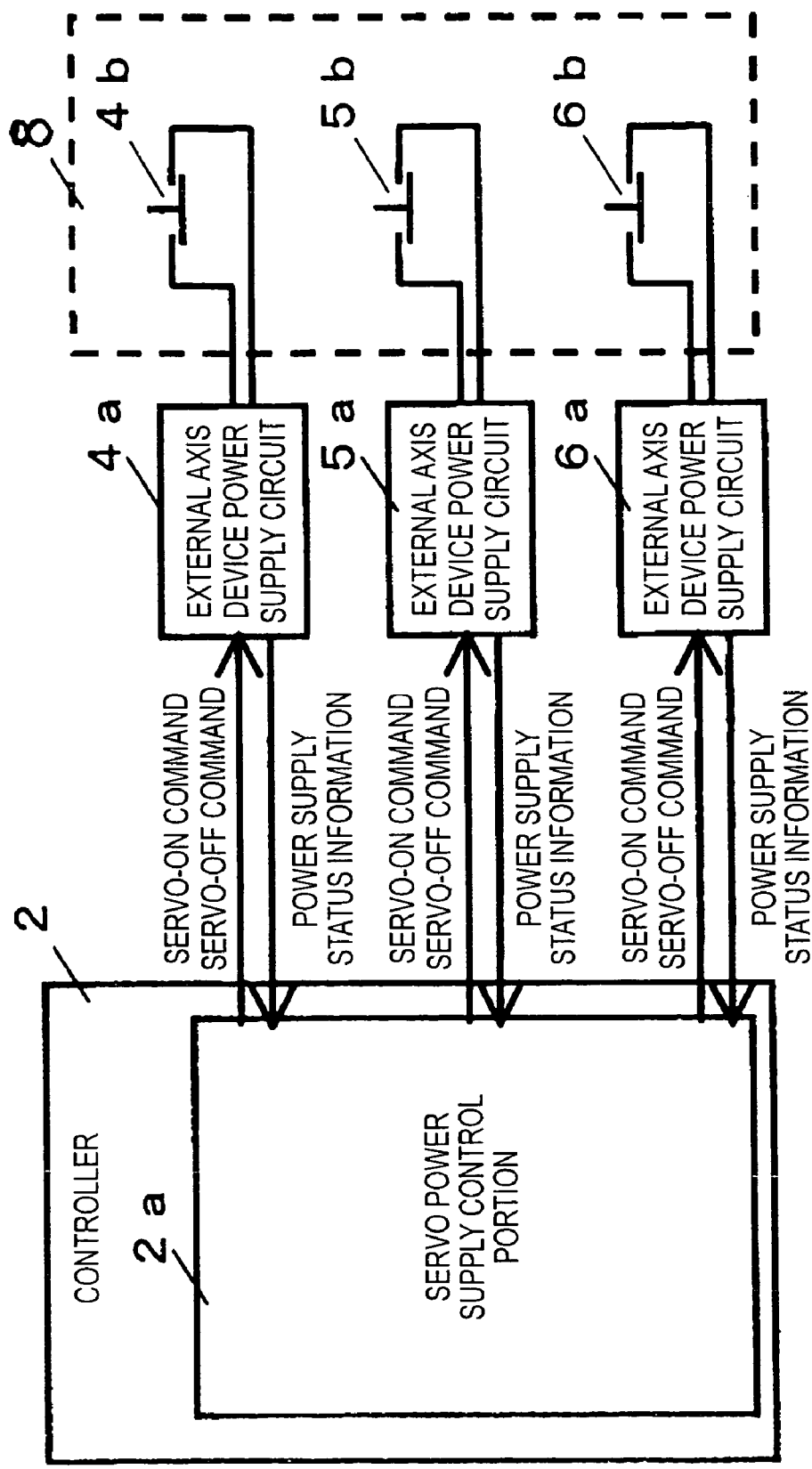
FIG. 2 An explanatory view showing an image of a process of each device in the embodiment of the present invention.

FIG. 2 is an explanatory view for explaining the connection state of circuits in the robot apparatus according to the embodiment of the present invention. A servo power supply control portion 2a is provided inside the controller 2. Power supply circuits 4a, 5a and 6a of the external axis devices 4, 5 and 6 are connected to this servo power supply control portion 2a. A servo-on command signal for turning on the power or a servo-off command signal for turning off the power are transmitted to each power supply circuit 4a, 5a, 6a.

In addition, the power supply circuits 4a, 5a and 6a are connected to the power switches 4b, 5b and 6b provided in the control panel 8 respectively. The status of each of these power switches 4b, 5b and 6b, that is, the status of each of the power supply circuits 4a, 5a and 6a is transmitted to the servo power supply control portion 2a.

Description will be made on the operation of the robot apparatus configured thus.

As described previously, each of the external axis devices 5 and 6 has two positions of the production working side 3a and the carrying out/in side 3b. The positions of the external axis devices 5 and 6 are replaced with each other by the turnaround of the external axis device 4.

When this external axis device 5 is located on the production working side 3a, the robot 1 works the work 7a on the external axis device 5. When the external axis device 6 is located on the production working side 3a due to the turnaround of the external axis device 4, the robot 1 works the work 7b on the external axis device 6.

On the other hand, when the external axis device 6 is located on the carrying out/in side 3b, a worker 9 carries out/in the work 7b on the external axis device 6. When the external axis device 5 is located on the carrying out/in side 3b due to the turnaround of the external axis device 4, the worker 9 carries out/in the work 7a on the external axis device 5.

Then, assume that the worker 9 is to carry out/in the work 7b when the external axis devices 5 and 6 have a position relationship as shown in FIG. 1. In this case, the worker 9 uses the power switches 4b and 6b on the control panel 8 so as to turn off the power supplies to the external axis device 4 and the external axis device 6 located on the carrying out/in side 3b. In this event, the power supplies are cut because the external axis device 4 and the external axis device 6 located on the carrying out/in side 3b are permitted to turn off the power by the controller 2.

On the other hand, when the power of the external axis device 6 located on the carrying out/in side 3b is on, the controller 2 outputs a command to turn off the power, to the power supply circuit 6a of this external axis device 6, so as to turn off the power of the external axis device 6. Incidentally, the aforementioned case where the power is on may include the case where the worker 9 has not turned off the power of the external axis device 6 by means of the power switch 6b, or the case where the worker 9 once turned off the power but turned on the power after that.

Next, assume that the worker 9 accidentally tries to turn off the power of the external axis device 5 on the production working side 3a by means of the power switch 5b when the external axis devices 5 and 6 have a position relationship as shown in FIG. 1. In this case, the external axis device 5 on the production working side 3a is not permitted to turn off the power by the controller 2. Accordingly, the robot apparatus as a whole halts due to an error. This is to prevent only the robot 1 from keeping working to thereby damage the work 7a when the power supply to the external axis device 5 on the production working side 3a is cut so that the external axis device 5 cannot operate.

When the work 7b is completely carried out/in, the worker 9 releases the power switches 4b and 6b of the external axis devices 4 and 6 on the control panel 8.

Then, when the production working is terminated, the controller 2 transmits the power supply circuit 4a a servo-on command signal to turn on the power of the external axis device 4. Thus, the external axis device 4 is operated to turn around so as to replace the positions of the external axis devices 5 and 6 to the carrying out/in side 3b and the production working side 3a respectively.

In this event, if the worker 9 is still carrying out/in the work and the power switches 4b and 6b of the external axis devices 4 and 6 on the control panel 8 remain off, the external axis device 4 is not permitted to turn on the power. Therefore, the controller 2 prevents the power of the external axis device 4 from being turned on.

In such a manner, the controller 2 can determine the on/off state of the power of each external axis device 4, 5, 6. Accordingly, the controller 2 can choose whether to wait till the power of the external axis device 4, 5, 6 is turned on or whether to handle the apparatus as an error, in accordance with the contents of a robot teaching program.

INDUSTRIAL APPLICABILITY

Robot apparatus according to the present invention can perform safe robot working and is useful in the field of working with a robot.

The invention claimed is:

1. Robot apparatus comprising:
   a robot;
   a controller for controlling working of said robot; and
   a plurality of external devices to be controlled by said controller;
   wherein a position of each of the external devices is changed between a first side in connection with the working of said robot and a second side which differs from the first side,
   wherein each of said external devices is provided with:
      a power switch to be operated by an operator for turning on/off a power supply to said each of said external devices; and
      a power supply circuit to be operated from said controller for turning on/off said power supplies,
   wherein said power switches are connected in parallel with said controller, and
   wherein priority is given to operation using said power switch over operation from said controller as to turning off said power supply of said each external device.

2. Robot apparatus according to claim 1, wherein a command to turn on said power supply is output from said controller to said power supply circuit of each of ones of said external device which are located at the position of the first side.

3. Robot apparatus according to claim 1, wherein a command to turn off a power supply is output from said controller to said power supply circuit of each of ones of said external device which are located at the position of the second side.

4. Robot apparatus according to claim 1, wherein said power supply circuit of each of said external devices is connected to a power switch, so that a status of said power switch is transmitted from said power supply circuit to said controller.

5. Robot apparatus according to claim 4, wherein said controller performs an error correcting process when said power switch of an external device located at the position of the first side turns off a power supply thereto.

6. Robot apparatus according to claim 5, wherein said robot and said external device are suspended as said error correcting process, while display means to be controlled by said controller is provided, and a display showing an error is displayed by said display means.

7. Robot apparatus according to claim 4, wherein when said power switch of said external device located at the position of the second side turns on said power supply thereto, said controller outputs, to said power supply circuit of said external device, a command to cut said power supply.

8. Robot apparatus according to claim 4, wherein said controller changes working of said robot in accordance with a status of said power switch of each of said external devices.

9. Robot apparatus according to claim 1, wherein the priority is given to an operation of turning off an external device of the plurality of external devices which is located at the position of the second side using the power switch over an operation of turning on the external device which is located at the position of the first side using the controller.

10. Robot apparatus according to claim 1, wherein the first side is a production working side in connection with the working of said robot, and the second side is a carrying out/in side for carrying out or in a work piece by a worker.

11. Robot apparatus comprising:
a robot;
a controller for controlling working of said robot; and
a plurality of external devices to be controlled by said controller, the plurality of external devices comprising:
   a first external device for placing a work piece thereon;
   a second external device for placing a work piece thereon; and
   a third external device which supports the first and second external devices;
wherein the third external device is adapted to change positions of the first and second external devices between a production working side for working in connection with the robot and a carrying out/in side for carrying out or in the work piece,
wherein each of said external devices is provided with:
   a power switch to be operated by an operator for turning on/off a power supply to said each of said external devices; and
   a power supply circuit to be operated from said controller for turning on/off said power supplies; and
wherein priority is given to turning off operation of the first or second external device which is located at the position of the carrying out/in side and the third external device using said power switch over operation from turning on operation by said controller.

12. Robot apparatus according to claim 11, wherein the third external device changes the positions of the first and second external devices by a turnaround about an axis of the third external device.

* * * * *